(12) United States Patent
Park

(10) Patent No.: US 12,705,894 B2
(45) Date of Patent: Aug. 11, 2026

(54) EVENT DETECTION SYSTEM USING MULTI-MODAL GENERATIVE ARTIFICIAL INTELLIGENCE MODEL

(71) Applicant: EdgeDX Co., Ltd., Seoul (KR)

(72) Inventor: Dong Uk Park, Seoul (KR)

(73) Assignee: EdgeDX Co., Ltd., Seoul (KR)

( * ) Notice: Subject to any disclaimer, the term of this patent is extended or adjusted under 35 U.S.C. 154(b) by 0 days.

(21) Appl. No.: 18/963,371

(22) Filed: Nov. 27, 2024

(65) Prior Publication Data

US 2026/0148553 A1 May 28, 2026

(30) Foreign Application Priority Data

Nov. 27, 2024 (KR) ........................ 10-2024-0172003

(51) Int. Cl.
*G06V 20/40* (2022.01)
*G06T 7/20* (2017.01)
*G06V 20/52* (2022.01)

(52) U.S. Cl.
CPC ................ *G06V 20/44* (2022.01); *G06T 7/20* (2013.01); *G06V 20/52* (2022.01); *G06V 2201/07* (2022.01)

(58) Field of Classification Search
CPC .... G06V 20/44; G06V 20/52; G06V 2201/07; G06T 7/20
See application file for complete search history.

(56) References Cited

U.S. PATENT DOCUMENTS

2021/0406557 A1* 12/2021 Lamego ................. G06N 20/00

FOREIGN PATENT DOCUMENTS

KR 10-2022-0000184 A 1/2022
KR 10-2023-0152410 A 11/2023
KR 10-2596977 B1 11/2023
KR 10-2023-0166410 A 12/2023

OTHER PUBLICATIONS

Office Action mailed on Feb. 19, 2026 from Ministry of Intellectual Property for Application No. 10-2024-0172003.

* cited by examiner

*Primary Examiner* — James M Pontius

(57) ABSTRACT

Provided is a system for detecting an event using a multi-modal generative artificial intelligence (AI) model, the system including an edge device that analyzes videos, which are recorded by one or more cameras installed in a space to be monitored, in real time through one or more AI model parts and detects an event, and a server device that verifies an event detection result of the edge device on the basis of the event detection result transmitted by the edge device and preset specification information of the AI model parts, analyzes a response acquired through the multimodal generative AI model using a prompt that requests additional information for event detection in accordance with a verification result, and controls operations of the AI model parts of the edge device.

10 Claims, 5 Drawing Sheets

20
MULTIMODAL GENERATIVE ARTIFICIAL INTELLIGENCE MODEL
10
EVENT DETECTION SYSTEM
13
SERVER DEVICE
11
EDGE DEVICE
30

EVENT DETECTION SYSTEM
10
11
EDGE DEVICE
111
VIDEO COLLECTOR
113
MODEL SETTING PART
115
VIDEO ANALYZER
1151
FIRST AI MODEL PART
1152
SECOND AI MODEL PART
1153
THIRD AI MODEL PART
1154
FOURTH AI MODEL PART
117
STATISTICS CALCULATOR
13
SERVER DEVICE
137
MODEL CONTROLLER
135
RESPONSE ANALYZER
131
PROMPT GENERATOR
133
MODEL INTEROPERATION PART
20
MULTIMODAL GENERATIVE AI MODEL
30

DETECT INTRUSION
DETECT WANDERING PERSON
Bank
DETECT STOPPING
STORE
DETECT POSTURE IN SPECIFIC DIRECTION
DETECT ANIMAL
DETECT ILLEGAL DUMPING
DETECT FIRE AND SMOKE

FIG.4

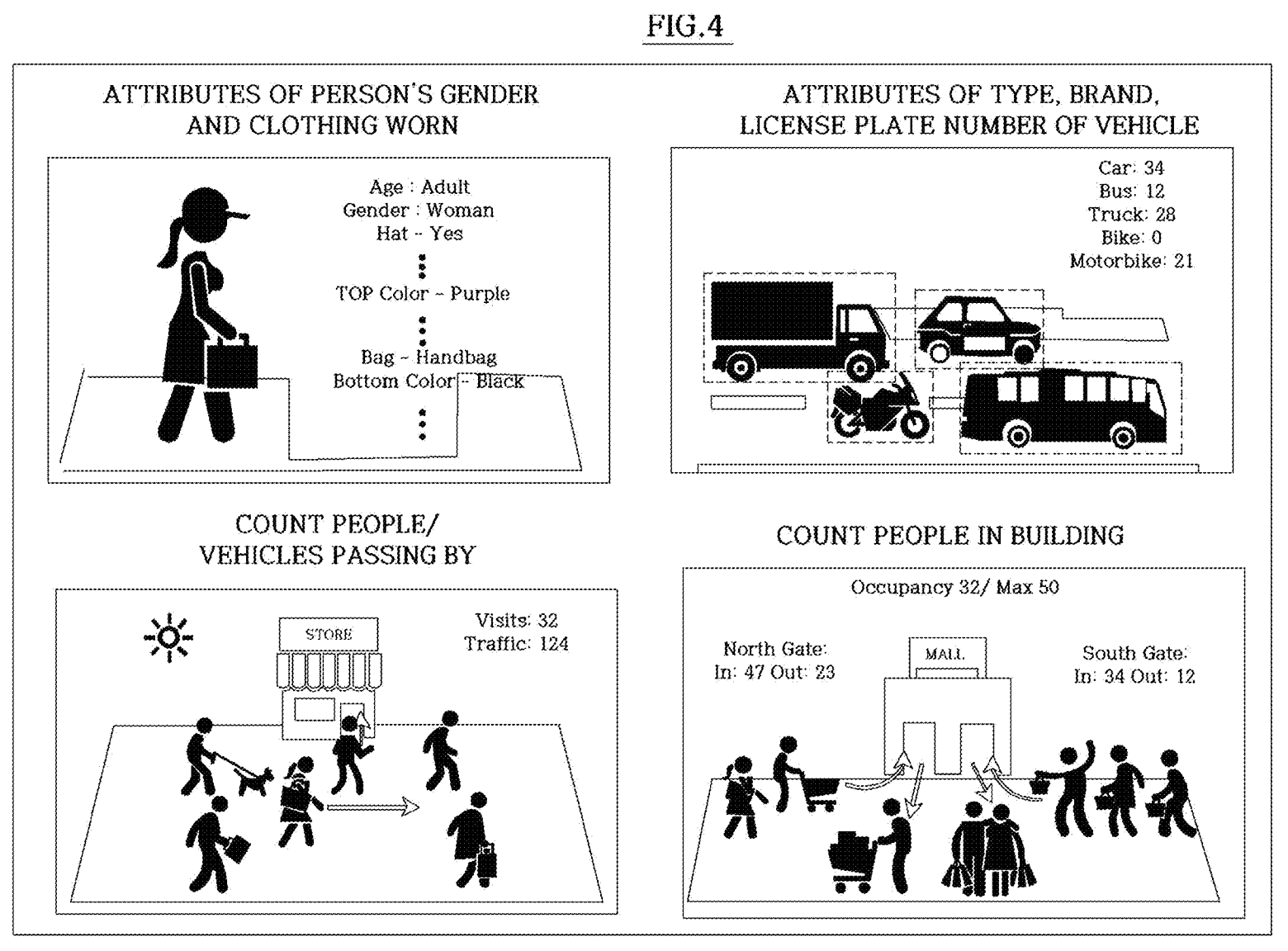

ATTRIBUTES OF PERSON'S GENDER AND CLOTHING WORN

Age : Adult
Gender : Woman
Hat - Yes
⋮
TOP Color ~ Purple
⋮
Bag ~ Handbag
Bottom Color ~ Black
⋮

ATTRIBUTES OF TYPE, BRAND, LICENSE PLATE NUMBER OF VEHICLE

Car: 34
Bus: 12
Truck: 28
Bike: 0
Motorbike: 21

COUNT PEOPLE/ VEHICLES PASSING BY

STORE
Visits: 32
Traffic: 124

COUNT PEOPLE IN BUILDING

Occupancy 32/ Max 50
MALL
North Gate:
In: 47 Out: 23
South Gate:
In: 34 Out: 12

EVENT DETECTION SYSTEM USING MULTI-MODAL GENERATIVE ARTIFICIAL INTELLIGENCE MODEL

CROSS-REFERENCE TO RELATED APPLICATION(S)

This application claims priority from Korean Patent Application No. 10-2024-0172003, filed on Nov. 27, 2024, in the Korean Intellectual Property Office, the disclosure of which is incorporated herein by reference in its entirety.

BACKGROUND

1. Field

The present invention relates to a technology for detecting an abnormality in an image, and more particularly, to a technology for detecting an abnormal situation in an image in connection with a multimodal generative artificial intelligence (AI) model.

2. Description of Related Art

Analyzing surveillance video recorded by a closed-circuit television (CCTV) camera is to detect objects in the recorded video and determine whether a specific event has occurred using information such as the types, actions, number, and the like of the detected objects. Instead of a method in which a manager monitors a plurality of videos in person through a monitoring device, a technology for analyzing videos using computer vision technology and automatically detecting whether a defined event occurs has been emerged and is being widely used.

Lately, a technology for analyzing a surveillance video on the basis of edge computing technology and artificial intelligence (AI) technology has been adopted for an edge device to analyze a video through an AI application, which is executed on the edge device in close proximity to the installation place of a CCTV camera or a camera, and monitor whether a defined event occurs.

However, in the case of edge devices, low power is required and a processing capability is limited due to characteristics thereof. Accordingly, AI models included in AI applications executed on edge devices show a relatively poor detection capability, resulting in false alarms and other issues.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is directed to providing a system that utilizes a multimodal generative artificial intelligence (AI) model to effectively analyze video data, which is collected in real time, in connection with video analysis of an edge device and accurately detect whether an event has occurred.

In one general aspect, a system for detecting an event using a multimodal generative AI model includes an edge device and a server device.

The edge device receives videos, which are recorded by one or more cameras installed in a space to be monitored, in real time to analyze the videos, includes one or more AI model parts each of which detects a defined event on the basis of a set rule to detect the event, and transmits an event detection result including metainformation related to the detected event.

The server device verifies the event detection result of the edge device on the basis of the event detection result transmitted by the edge device and preset specification information of the AI model parts included in the edge device, generates a prompt that requests additional information for event detection in accordance with a verification result, transmits the prompt, analyzes a response acquired from the multimodal generative AI model, and controls operations of the AI model parts of the edge device.

The edge device may include a video collector and a video analyzer.

The video collector may receive and store the videos recorded in real time by the one or more cameras.

The video analyzer may include one or more first AI model parts for detecting objects in the recorded videos and detecting the defined event on the basis of the set rule, to detect the event and transmit the event detection result including the metainformation related to the detected event.

The server device may include a prompt generator, a generative AI model interoperation part, a response analyzer, and a model controller.

The prompt generator may request that the event detection result of the edge device be verified on the basis of the event detection result transmitted by the edge device and the preset specification information of the AI model parts included in the edge device and generate the prompt that requests additional information from the edge device for event detection in accordance with the verification result.

The model interoperation part may interoperate with the multimodal generative AI model, transmit the generated prompt, and acquire the response.

The response analyzer may check accuracy of the event detection result of the edge device by analyzing the response acquired from the multimodal generative AI model and select an AI model part which performs the additional information request included in the response on the basis of the preset specification information of the AI model part included in the edge device.

The model controller may transmit control information for controlling an operation of the selected AI model part such that the AI model part acquires the requested additional information.

The edge device may further include a model setting part.

The model setting part may set and control whether to operate the AI model parts in accordance with performance of the edge device and the control information of the server device.

The video analyzer of the edge device may further include one or more second AI model parts configured to extract attributes related to the objects detected in the recorded videos.

The video analyzer of the edge device may further include one or more third AI model parts configured to track a designated one of the objects detected in the recorded videos.

The model setting part of the edge device may perform control such that some of the AI model parts included in the video analyzer are in a standby state, and may perform control in accordance with the control information received from the server device such that the AI model parts in the standby state may operate to acquire the requested additional information.

The model setting part may operate the AI model parts in the standby state in accordance with the control information received from the server device, and when it is determined that performance of the edge device is insufficient, may perform control such that other AI model parts in an operational state are switched to the standby state.

The edge device may further include a statistics calculator configured to calculate statistical information related to the objects detected by the AI model parts.

In this case, the metainformation which is related to the event and included in the event detection result may include the statistical information.

The video analyzer of the edge device may further include one or more fourth AI model parts configured to detect the event on the basis of the statistical information.

The edge device and the server device may be configured as one device.

BRIEF DESCRIPTION OF THE DRAWINGS

FIG. 4 is a diagram showing examples of second AI model parts included in an edge device of the present invention.

Figure 1:
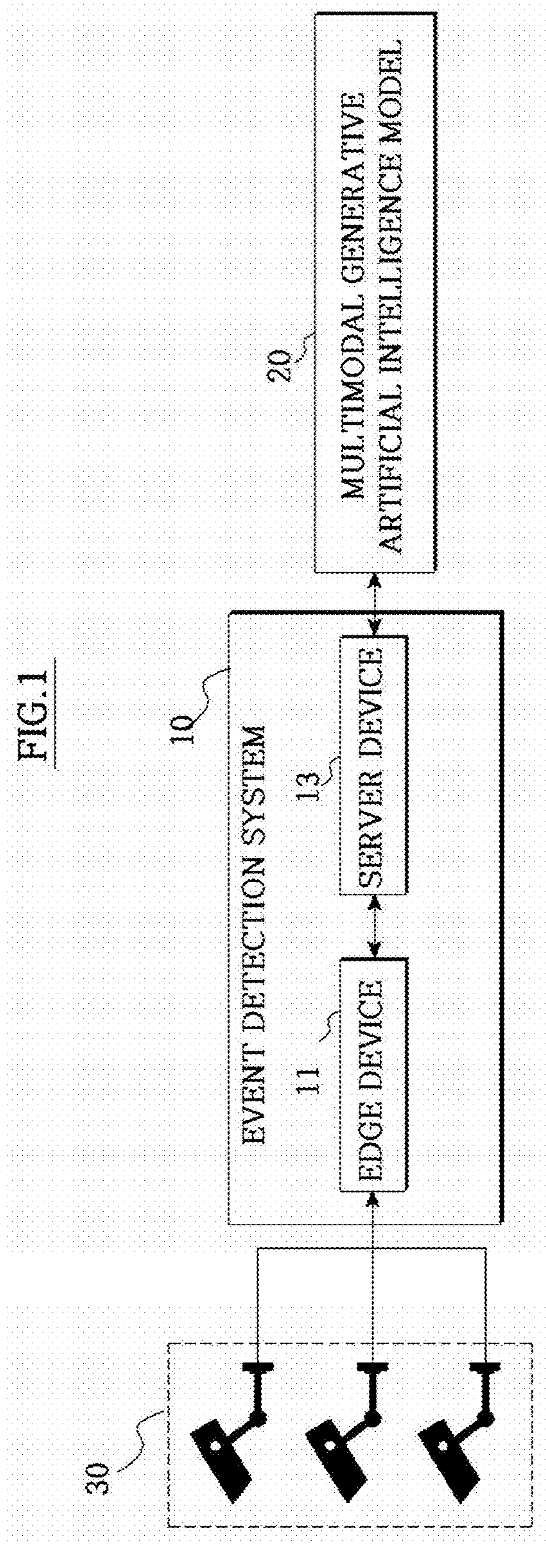
FIG. 1 is a diagram conceptually showing an event detection system of the present invention.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described and additional aspects will be specified through exemplary embodiments described with reference to the accompanying drawings. It will be understood that components of each of the embodiments may be combined in various ways within the embodiment or combined with elements of other embodiments in various ways unless otherwise stated or contradicted in the context. In some cases, each block in a block diagram may represent a physical part, and in other cases, each block in a block diagram may be a logical representation of a portion of a function of one physical part or a logical representation of a function across a plurality of physical parts. In some cases, a block or an entity of a portion of a block may be a set of program instructions. All or some of the blocks may be implemented as hardware, software, or a combination thereof.

FIG. 1 is a diagram conceptually showing an event detection system of the present invention. An event detection system 10 employing a multimodal generative artificial intelligence (AI) model part according to an aspect of the present invention includes an edge device 11 and a server device 13.

The edge device 11 is an edge computing device and may be connected to one or more cameras 30 through a network or the like. The edge device 11 is a video analysis device that analyzes a video which is collected in real time from the one or more cameras 30 connected thereto and generates an event (e.g., a security event of intrusion detection). The edge device 11 is a device that is installed in each site, and is also referred to as an edge box. Generally, multiple edge devices are installed. However, the edge device 11 is not limited thereto and may include a video input device, such as an AI camera, therein.

The edge device 11 is a computing device that analyzes a video, and includes a processor and a memory that is connected to the processor and includes program instructions executable by the processor. The edge device 11 may be a computing device including a storage device, a network device, an input device, and the like in addition to the processor and the memory. The processor executes program instructions, and the memory is connected to the processor and stores the program instructions executable by the processor, data to be used for computations by the processor, data processed by the processor, and the like.

The edge device 11 includes multiple program modules configured using program instructions executable by the processor.

The cameras 30 connected to the edge device 11 may be analog cameras or Internet protocol (IP) cameras.

The edge device 11 receives videos, which are recorded by the one or more cameras 30 installed in a space to be monitored, in real time to analyze the videos. Video analysis of the edge device 11 may be to detect whether a specific event has occurred. In other words, the edge device 11 analyzes in real time a video recorded for an event which is set in accordance with a surveillance purpose and detects whether the event has occurred.

The edge device 11 detects an event through an AI model part that detects a defined event on the basis of set rules. The edge device 11 may include one or more AI model parts, each of which detects an event on the basis of rules that are separately set in accordance with analysis purposes.

The AI model part may be a rule-based model, a machine learning model, or a deep-learning model or may include a combination of two or more thereof. The AI model part may include a discriminative AI model or a generative AI model. The discriminative AI model is designed to learn a large amount of data (types of objects, attribute information, and the like) labeled in advance, classify objects of new input data or extract attributes, and track an object as necessary. For example, a discriminative AI model may be utilized to detect an object (e.g., a person, a vehicle, trash) or extract attributes (e.g., color, size, a location, the articular locations of a person, text information, and the like) of a detected object. Unlike knowledge-based generative models, the discriminative AI does not comprehensively understand or interpret objects or situations but rather focuses on object recognition and attribute extraction on the basis of training data. Such a model extracts information about specific objects or attributes, and the judgment and detection of an event is performed by a rule engine or an additional analysis system. Therefore, the AI model part of the present invention conceptually includes a rule engine and the like that performs the judgment and detection of an event. The AI model part detects an object, an action of an object, or the like from a video and detects whether an event has occurred by judging whether the detected object or action of the object satisfies a set rule. For example, the AI model part may be a model that detects a situation in a video, such as illegal dumping of trash in a specific place, as an event. In this case, the AI model part may include a combination of a deep learning model that detects objects (e.g., people and trash)

and a deep learning model that recognizes an action (e.g., dumping) of an object. Here, the set rule may be to detect both people and trash in a set area of the video, and to detect an event as a situation of illegal trash dumping when a dumping action of a person is detected in the video.

When an event is detected through the AI model part, the edge device 11 may verify the event through the server device 13 such that a wrong alarm does not occur for the detected event. Therefore, the edge device 11 transmits an event detection result including metainformation related to the detected event to the server device 13. In this case, the detected event transmitted by the edge device 11 may be transmitted in the form of an event identifier (ID) which is assigned to identify the event, and the related metainformation includes a still image extracted from the video in which the event has been detected or a video of the time point of event detection and may include information about the types, number, and the like of detected objects.

Figure 2:
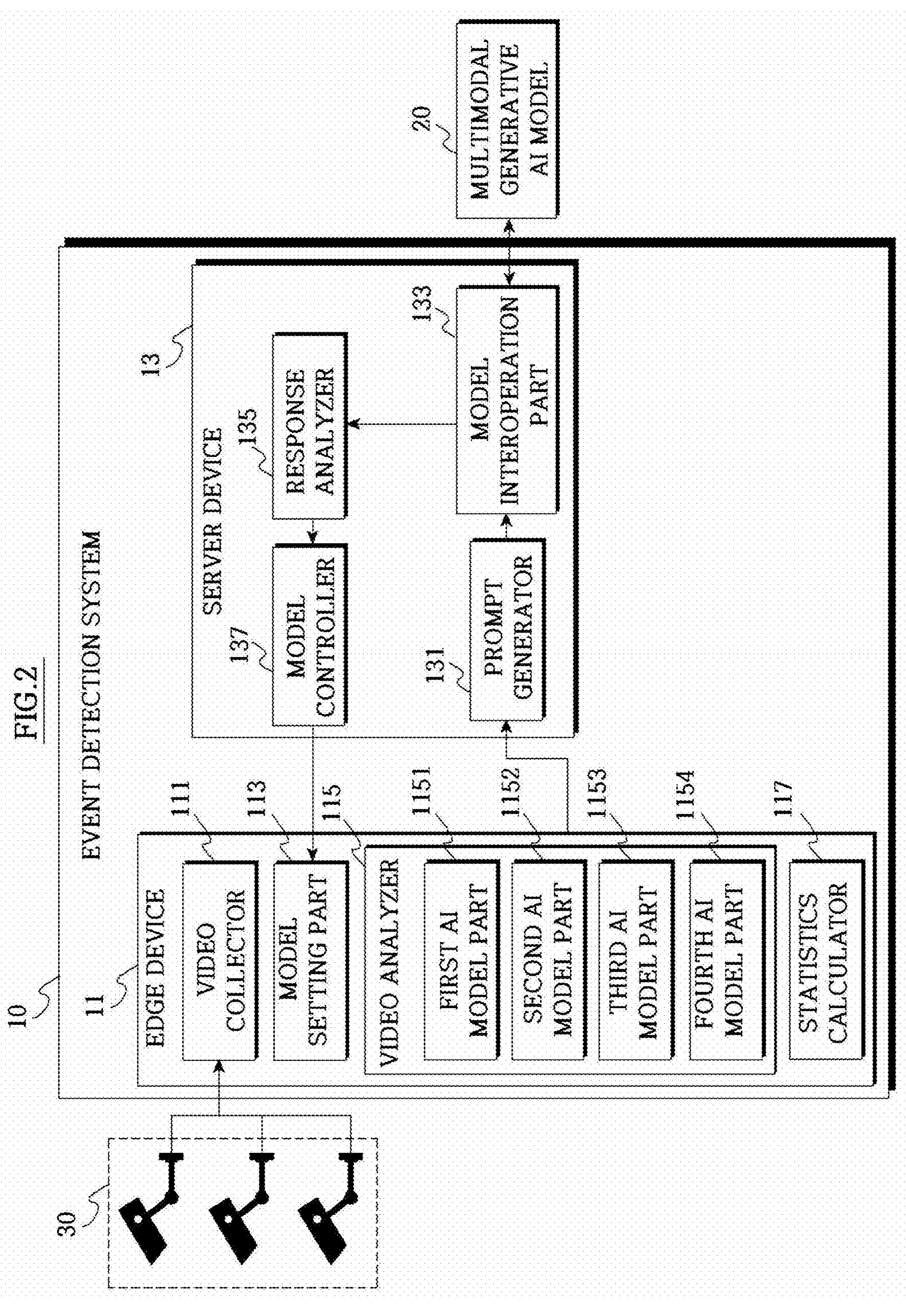
FIG. 2 is a block diagram of the event detection system of the present invention.

FIG. 2 is a block diagram of the event detection system of the present invention. Specifically, the edge device 11 of the event detection system 10 employing a multimodal generative AI model includes a video collector 111 and a video analyzer 115.

At least a part of the functionality of the video collector 111 and the video analyzer 115 may be implemented as a set of computer program instructions which are executed by the processor of the edge device 11.

The video collector 111 receives videos recorded in real time from the one or more cameras 30 which are connected to the edge device 11 through a network and stores the received videos. The video collector 11 may store the recorded videos in a storage device in the edge device 11 or store the recorded videos in a network video recorder (NVR) device.

The video analyzer 115 may include at least one first AI model part 1151.

The first AI model part 1151 may be a rule-based model, a machine learning model, or a deep-learning model or may include a combination of two or more thereof. The first AI model part 1151 may include a rule engine and the like that performs the judgment and detection of an event.

Figure 3:
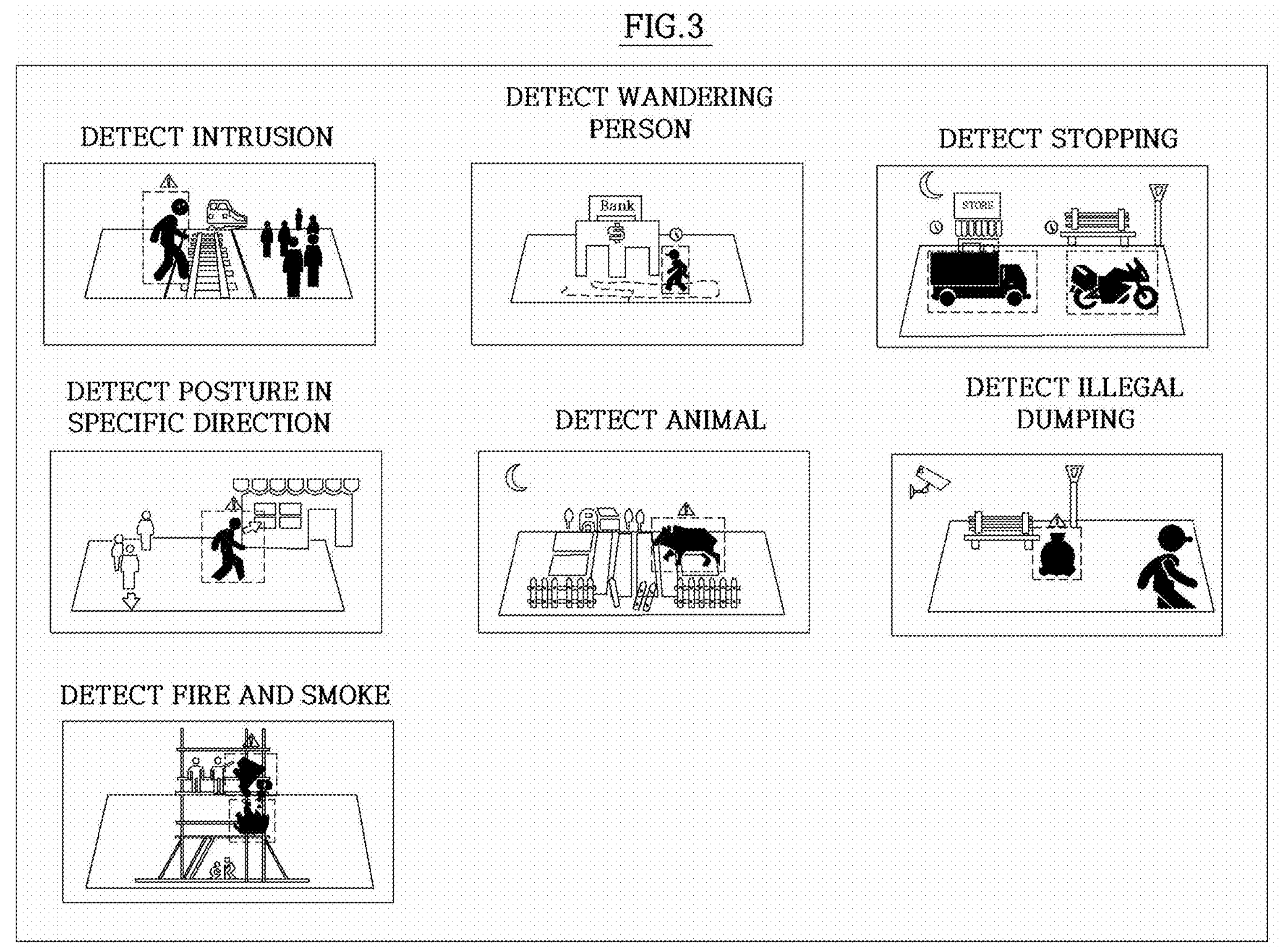
FIG. 3 is a diagram showing examples of first artificial intelligence (AI) model parts included in an edge device of the present invention.

FIG. 3 is a diagram showing examples of first AI model parts included in an edge device of the present invention. The first AI model part 1151 detects objects in recorded videos and detects defined events on the basis of set rules.

The video analyzer 115 may include a plurality of first AI model parts 1151 in consideration of the surveillance purpose of the edge device 11, the performance of the edge device 11, and the like.

As shown in FIG. 3, examples of the first AI model parts 1151 may include a model for determining intrusion detection, such as detecting a person in a set no-entry zone, a model for detecting a person wandering in a set specific zone, a model for detecting an object (person or vehicle) that has not moved for a certain period of time, a model for detecting a person intentionally orienting his or her body in a certain direction, a model for detecting an animal in a surveillance area, a model for detecting trash dumping in a certain area, a model for detecting a fire outbreak, and the like.

FIG. 4 is a diagram showing examples of second AI model parts 1152 included in an edge device of the present invention. According to an additional aspect of the present invention, the video analyzer 115 of the edge device 11 may further include at least one second AI model part 1152.

The second AI model part 1152 includes an AI model that extracts attributes related to objects detected in a recorded video. For example, the second AI model part 1152 may extract attributes such as a person's gender or clothing worn, the brand, type, and license plate number of a vehicle, and the like.

The video analyzer 115 may include a plurality of second AI model parts 1152 in consideration of the surveillance purpose of the edge device 11, the performance of the edge device 11, and the like.

As shown in FIG. 4, examples of the second AI model parts 1152 may include a model for detecting attributes of a person's gender and clothing worn, a model for detecting the type, brand, and license plate number of a vehicle, a model for counting the number of occupied people in a set zone, a model for counting the number of people passing through a set area, a model for counting vehicles passing through a set area, and the like.

According to an additional aspect of the present invention, the video analyzer 115 of the edge device 11 may further include at least one third AI model part 1153.

The third AI model part 1153 may include a model that tracks a designated one of objects detected in a recorded video. The third AI model part 1153 detects an object on the basis of each set rule. For example, the set rule is to track a person entering a specific area in a video, and when a person entering the area is detected, the third AI model part 1153 performs object tracking.

The server device 13 verifies an event detection result of the edge device 11 on the basis of the event detection result transmitted by the edge device 11 and preset specification information of the AI model parts included in the edge device 11, generates a prompt that requests additional information for event detection in accordance with the verification result, transmits the prompt, analyzes a response acquired from a multimodal generative AI model 20, and controls operations of the AI model parts of the edge device 11. As the prompt generated by the server device 13, a prompt template which is prepared in advance may be used without any changes or may be partially modified.

The server device 13 may be connected to one or more edge devices 11 through a network and may receive a event detection result from the one or more edge devices 11 and process the event detection result. The server device 13 may be a single server computer or a cloud server. The server device 13 is a device including a processor and a memory which is connected to the processor and includes program instructions executable by the processor. In addition to the processor and the memory, the server device 13 may further include a storage device, a network device, a display, an input device, and the like. The processor executes program instructions, and the memory is connected to the processor and stores program instructions executable by the processor, data to be used for computations by the processor, data processed by the processor, and the like.

The server device 13 interoperates with a generative AI model, that is, a large language model (LLM), particularly, a large multimodal model (LMM). The multimodal generative AI model 20 is an LMM, which refers to an AI model that learns a variety of data, such as text description and images or videos of objects, actions, or situations, to understand different types of data in an integrating manner and accumulate advanced knowledge.

The model may analyze various input data, such as text, images, videos, and the like, to understand meanings of the input data and may determine an event or provide related information on the basis of the meanings.

The server device 13 verifies the event detection result received from the edge device 11 through the multimodal generative AI model 20, analyzes a response of the multimodal generative AI model 20 to determine whether additional information is required for accurately detecting whether an event has occurred, and controls the edge device 11 to acquire the additional information through the edge device 11.

The server device 13 of the event detection system 10 employing a multimodal generative AI model according to an aspect of the present invention includes a prompt generator 131, a generative AI model interoperation part 133, a response analyzer 135, and a model controller 137.

At least a part of the functionality of the prompt generator 131, the generative AI model interoperation part 133, the response analyzer 135, and the model controller 137 may be implemented as a set of computer program instructions which are executed by the processor of the server device 13.

A prompt is a question input to a generative AI model and may be considered an instruction that induces the model to generate a response and output the response. A prompt transmitted to the multimodal generative AI model 20 includes not only text but also information in other forms such as images and the like.

The prompt generator 131 requests that the event detection result of the edge device 11 be verified on the basis of the event detection result transmitted by the edge device 11 and the preset specification information of the AI model parts included in the edge device 11 and generate a prompt that requests additional information from the edge device 11 to detect an event in accordance with the verification result. The purpose of including the event detection result in the prompt generated by the prompt generator 131 is to allow the multimodal generative AI model 20 to verify the event detection result, that is, determine whether a specific event has occurred by analyzing images included in the event detection result. The purpose of including the preset specification information of the AI model parts in the prompt generated by the prompt generator 131 is to allow the multimodal generative AI model 20 to generate a response that requires additional information collection from the edge device 11 for accurate event detection when it is not clear from the currently received event detection result whether an event has occurred. In other words, the multimodal generative AI model 20 verifies the event verification result of the edge device 11, and when it is not determined from the verification result that an event has occurred but there is a suspicious circumstance, the prompt generator 131 generates a prompt for the AI model parts of the edge device to 11 to generate a response that requests additional information collection required for accurately determining whether an event has occurred. For example, the edge device 11 includes an image $I_A$, which is transmitted together with a result that an event $E_A$ has occurred as an event detection result and leads to the judgment of the occurrence of the event $E_A$, in the prompt and transmits the prompt to the multimodal generative AI model 20 such that the generative AI model 20 may determine whether the event $E_A$ has occurred and an AI model part, which may detect additional information required for accurately determining whether the event $E_A$ has occurred, may detect additional information using preset specification information of the AI model part included in the edge device 11 which is included in the prompt.

The preset specification information of the AI model part is information describing how the AI model part operates such as information about an event to be detected by the AI model part, information about objects, attributes of the objects, or actions of the objects to be detected, and the like.

The prompt generator 131 may utilize a template prompt which has been stored in advance to generate a prompt or may utilize the template prompt without any changes. In the event detection system 10 of the present invention, the edge device 11, the server device 13, and the multimodal generative AI model 20 may repeatedly interoperate with one another to accurately detect an event using the multimodal generative AI model 20. The prompt generator 131 may generate a new prompt by nesting repeated interoperation in a prompt which has been used in a previous procedure such that the repeated interoperation may be managed as one continuous conversation.

The model interoperation part 133 interoperates with the multimodal generative AI model 20 to transmit the generated prompt and acquire a response. The model interoperation part 133 may interoperate with the multimodal generative AI model 20 using an application programming interface (API) provided by the multimodal generative AI model 20. As described above, in the event detection system 10 of the present invention, the edge device 11, the server device 13, and the multimodal generative AI model 20 may repeatedly interoperate with one another to accurately detect an event using the multimodal generative AI model 20, and thus the model interoperation part 133 may manage repeated interoperation as one continuous conversation session.

The response analyzer 135 analyzes the response that is acquired for the prompt transmitted to the multimodal generative AI model 20. Since the response of the multimodal generative AI model 20 is based on text, the response analyzer 135 identifies the structure and meanings of the response through natural language processing.

The response analyzer 135 checks accuracy of the event detection result of the edge device 11 from the meaning of the event detection result among the meanings of the response identified through natural language processing.

Responses of the multimodal generative AI model 20 may be classified into three categories. As the first category, the multimodal generative AI model 20 may give a response stating that the same event is detected as the event detected by the edge device 11. As the second category, the multimodal generative AI model 20 may give a response stating that the event detected by the edge device 11 is not detected. As the third category, the multimodal generative AI model 20 may give a response requesting additional information for accurate judgment because the event detected by the edge device 11 is not detected but there is a suspicious circumstance.

For a response in the first category, the response analyzer 135 determines that an event has occurred and instructs an alarm associated with the event to be raised. For a response in the second category, the response analyzer 135 determines that no event is detected in an image included in the prompt and does not take additional measures. For a response in the third category, the response analyzer 135 determines that no event is detected but there is a suspicious circumstance. Since the response in the third category requests additional information from the edge device 11 as requested by the prompt, the response analyzer 135 selects an AI model part that will perform the additional information request included in the response on the basis of the preset specification information of the AI model part included in the edge device 11 and notifies this to the model controller 137.

The model controller 137 transmits control information for controlling an operation of the selected AI model part such that the AI model part may acquire the requested additional information on the basis of information about the additional information request received from the response analyzer 135.

According to an additional aspect of the present invention, the edge device 11 may further include a model setting part 113.

At least a part of the functionality of the model setting part 113 may be implemented as a set of computer program instructions which are executed by the processor of the edge device 11.

As described above, the edge device 11 may include a plurality of AI model parts in accordance with each of purposes, and according to setting information of the edge device 11, some AI model parts are not always run but are run only when there is a request, to perform a purpose judgment function determined in accordance with a purpose. The model setting part 113 may control whether to run an AI model part in accordance with the setting information of the edge device 11.

In addition, the model setting part 113 may set and control whether to operate the AI model parts in accordance with performance of the edge device 11 and control information of the server device 13. The model setting part 113 may control an operation of the AI model part which performs the additional information request of the multimodal generative AI model 20 to put the AI model part to an operational state when the AI model part is in a standby state.

As described above, the model setting part 113 of the edge device 11 may perform control in accordance with the setting information or the performance of the edge device 11 such that some AI model parts included in the video analyzer 115 is in a standby state. For example, the model setting part 113 may put the third AI model part 1153, which tracks objects, to a standby state until a specific event occurs.

The model setting part 113 may control the AI model part, which is in a standby state, in accordance with the control information received from the server device 13 such that the AI model part may operate to acquire the requested additional information. For example, the model setting part 113 may control the third AI model part 1153, which is in a standby state and tracks objects, in accordance with control information including additional information request of the server device 13 such that the third AI model part 1153 may be in an operational state to track a specific object.

Also, the model setting part 113 may operate AI model parts in a standby state in accordance with the control information received from the server device 13, and when it is determined that performance of the edge device 11 is insufficient, may perform control such that other AI model parts in an operational state are switched to a standby state. When the performance of the edge device 11 is insufficient to additionally operate an AI model part currently in a standby state in order to acquire additional information, other AI models that are less relevant to an event currently to be detected are controlled to be temporarily in a standby state. In this case, when the detection of the event currently to be detected is completed, the model setting part 113 may perform control such that the AI model parts temporarily in a standby state are switched back to an operational state.

According to an additional aspect of the present invention, the edge device 11 may further include a statistics calculator 117.

At least a part of the functionality of the statistics calculator 117 may be implemented as a set of computer program instructions which are executed by the processor of the edge device 11.

Depending on an event to be detected when an event is detected in a surveillance video, it may be inaccurate to detect the event from momentary still images or a short video in a surveillance video. For example, in the case of trying to detect an event in which a customer is stealing merchandise from a display stand in a grocery store, it is difficult to determine whether the customer is buying or stealing merchandise just by the action of picking up the merchandise. In this case, information about successive actions of the customer is required. Therefore, statistical information obtained through accumulating information detected by AI model parts and the like, which is performed by the statistics calculator 117.

The statistics calculator 117 calculates statistical information related to objects detected by AI model parts.

Here, metainformation related to an event included in the event detection result includes statistical information.

According to an additional aspect of the present invention, the video analyzer 115 of the edge device 11 may further include at least one fourth AI model part 1154.

The fourth AI model part 1154 may detect an event on the basis of statistical information. Each fourth AI model part 1154 also detects objects from statistical information on the basis of a set rule. For example, the set rule may trigger an event when a time spent by a customer at a particular display stand is more than five minutes, and the fourth AI model part 1154 may determine the occurrence of the event on the basis of statistical information.

According to an aspect of the present invention, the edge device 11 and the control server 13 may be configured as one device, that is, one computing device.

When the processing power of the edge device 11 is sufficient and there are not a large number of events to be simultaneously detected, software for implementing a control server may be executed on the edge device 11.

According to an aspect of the present invention, the multimodal generative AI model 20 may also be included in the single computing device.

Figure 5:
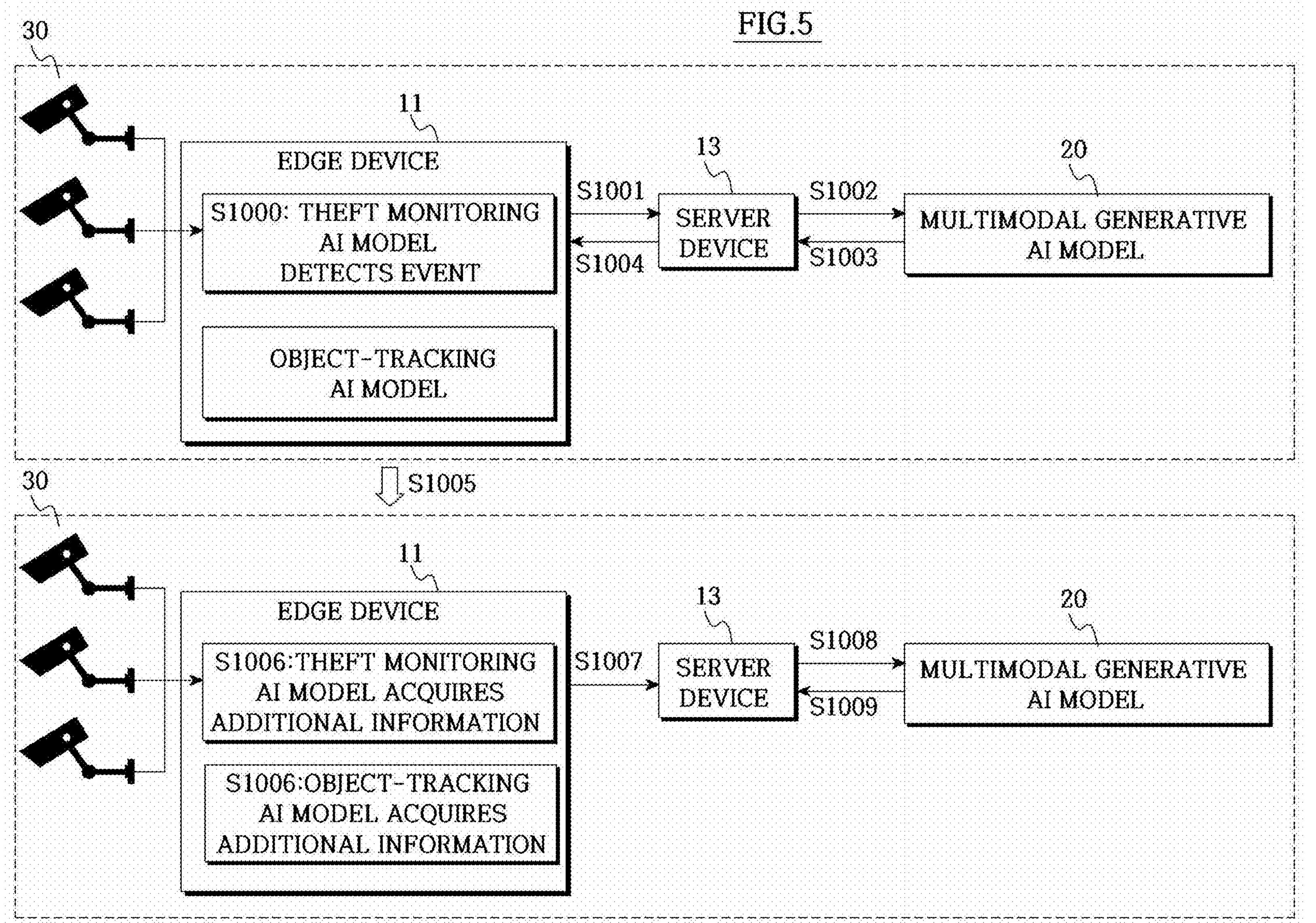
FIG. 5 is a diagram conceptually showing an exemplary embodiment of the event detection system of the present invention.

FIG. 5 is a diagram conceptually showing an exemplary embodiment of the event detection system of the present invention. FIG. 5 conceptually shows an exemplary embodiment in which the event detection system 10 of the present invention sets a grocery store as a monitoring area and detects an event.

In FIG. 5, the edge device 11 receives videos from a plurality of cameras 30 installed in the grocery store in real time and detects an event. The edge device 11 shown in FIG. 5 includes a theft monitoring AI model and an object-tracking AI model. The theft monitoring AI model is assumed to be in an operational state and the object-tracking AI model is assumed to be in a standby state.

According to the exemplary embodiment shown in FIG. 5, the theft monitoring AI model detects a theft event through video analysis (S1000) and transmits the event detection result to the server device 13 (S1001). Then, the server device 13 generates a prompt on the basis of the event detection result and specification information of AI model parts and then verifies whether a theft event has occurred using the multimodal generative AI model 20. The verification result indicates that no theft event has occurred, but it is determined that there is a suspicious circumstance. Accordingly, the server device 13 tracks a person who is acting suspiciously through the object-tracking AI model and requests additional information (S1002 and S1003). Then, the server device 13 controls the object-tracking AI model of the edge device 11 such that the object-tracking AI model may track the object (S1004), and the object-tracking AI model of the edge device 11 is switched from a standby state to an operational state (S1005) and acquires additional information (S1006). The edge device 11 transmits the acquired additional information to the server device 13 (S1007), and the server 13 reflects the additional information to the prompt to determine whether a theft event has occurred. Since it is determined that no theft event has occurred but there is still a suspicious circumstance, the server device 13 continuously requests additional information (S1008 and S1009).

According to the present invention, a multimodal generative AI model is utilized to effectively analyze video data, which is collected in real time, in connection with video analysis of an edge device, and whether an event has occurred can be accurately detected.

Although exemplary embodiments of the present invention have been described above with reference to the accompanying drawings, the present invention is not limited to the exemplary embodiments and should be construed as encompassing various modifications which can be clearly derived from the exemplary embodiments by those of ordinary skill in the art. The claims are intended to cover such modifications.

What is claimed is:

1. A system for detecting an event using a multimodal generative artificial intelligence (AI) model, the system comprising:

an edge device configured to receive videos, which are recorded by one or more cameras installed in a space to be monitored, in real time to analyze the videos, include one or more AI model parts each of which detects a defined event on the basis of a set rule to detect the event, and transmit an event detection result including metainformation related to the detected event;

wherein the edge device comprises:

a video collector configured to receive and store the videos recorded in real time by the one or more cameras; and a video analyzer including one or more first AI model parts for detecting objects in the recorded videos and detecting the defined event on the basis of the set rule, to detect the event and transit the event detection result including the metainformation related to the detected event; and a server device configured to verify the event detection result of the edge device on the basis of the event detection result transmitted by the edge device and preset specification information of the AI model parts included in the edge device, generate a prompt that requests additional information for event detection in accordance with a verification result, transmit the prompt, analyze a response acquired from the multimodal generative AI model, and control operations of the AI model parts of the edge device, wherein the server device comprises:

a prompt generator configured to request that the event detection result of the edge device be verified on the basis of the event detection result transmitted by the edge device and the preset specification information of the AI model parts included in the edge device and generate the prompt that requests additional information from the edge device for event detection in accordance with the verification result;

a generative AI model interoperation part configured to interoperate with the multimodal generative AI model, transmit the generated prompt, and acquire the response;

a response analyzer configured to check accuracy of the event detection result of the edge device by analyzing the response acquired from the multimodal generative AI model and select an AI model part which performs an additional information request included in the response on the basis of the preset specification information of the AI model parts included in the edge device; and a model controller configured to transmit control information for controlling an operation of the selected AI model part such that the AI model part acquires the requested additional information.

2. The system of claim 1, wherein the edge device further comprises a model setting part configured to set and control whether to operate the AI model parts in accordance with performance of the edge device and the control information of the server device.

3. The system of claim 2, wherein the model setting part performs control such that some of the AI model parts included in the video analyzer are in a standby state.

4. The system of claim 3, wherein the model setting part performs control in accordance with the control information received from the server device such that the AI model parts in the standby state operate to acquire the requested additional information.

5. The system of claim 4, wherein the model setting part operates the AI model parts in the standby state in accordance with the control information received from the server device, and, when it is determined that performance of the edge device is insufficient, performs control such that other AI model parts in an operational state are switched to the standby state.

6. The system of claim 1, wherein the video analyzer further includes one or more second AI model parts configured to extract attributes related to the objects detected in the recorded videos.

7. The system of claim 1, wherein the video analyzer further includes one or more third AI model parts configured to track a designated one of the objects detected in the recorded videos.

8. The system of claim 1, wherein the edge device further comprises a statistics calculator configured to calculate statistical information related to the objects detected by the AI model parts, and the metainformation which is related to the event and included in the event detection result includes the statistical information.

9. The system of claim 8, wherein the video analyzer further includes one or more fourth AI model parts configured to detect the event on the basis of the statistical information.

10. The system of claim 1, wherein the edge device and the server device are configured as one device.

* * * * *